(12) United States Patent
Slavens et al.

(10) Patent No.: US 10,260,422 B2
(45) Date of Patent: Apr. 16, 2019

(54) HEAT TEMPERATURE GRADIENT HEAT EXCHANGER

(71) Applicant: United Technologies Corporation, Farmington, CT (US)

(72) Inventors: Thomas N. Slavens, Moodus, CT (US); Mosheshe Camara-Khary Blake, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 326 days.

(21) Appl. No.: 15/148,051

(22) Filed: May 6, 2016

(65) Prior Publication Data
US 2017/0321605 A1 Nov. 9, 2017

(51) Int. Cl.
*F01D 13/02* (2006.01)
*F02C 7/18* (2006.01)
(Continued)

(52) U.S. Cl.
CPC .................. *F02C 7/18* (2013.01); *F02C 3/04* (2013.01); *F02C 6/08* (2013.01); *F02C 7/185* (2013.01); *F02C 9/18* (2013.01); *F02K 3/115* (2013.01); *F28F 9/0278* (2013.01); *F05D 2220/32* (2013.01); *F05D 2260/20* (2013.01); *F05D 2260/213* (2013.01); *F28D 2021/0021* (2013.01); *F28D 2021/0026* (2013.01); *F28F 2270/00* (2013.01); *Y02T 50/675* (2013.01)

(58) Field of Classification Search
CPC . F02C 7/18; F02C 7/10; F28F 2265/26; F28F 2270/00; F28F 2270/02
See application file for complete search history.

(56) References Cited

U.S. PATENT DOCUMENTS 3,705,621 A 12/1972 Schoonman
4,512,397 A 4/1985 Stark
(Continued)

FOREIGN PATENT DOCUMENTS

EP 2811249 A1 12/2014
WO 02/097354 A1 12/2002
(Continued)

OTHER PUBLICATIONS

European Search Report for EP Application No. 17169955.6 dated Oct. 11, 2017.

*Primary Examiner* — Justin Seabe
*Assistant Examiner* — Jason Mikus
(74) *Attorney, Agent, or Firm* — Carlson, Gaskey & Olds, P.C.

(57) ABSTRACT

A heat exchanger assembly includes an outer manifold defining an outer cavity. An inner cavity is defined by an inner shell supported within the outer manifold and at least partially surrounded by the outer cavity. The inner shell includes a plurality of impingement openings for directing airflow into the inner cavity. An inner manifold is supported within the inner cavity. The inner manifold is exposed to impingement airflow through the plurality of impingement openings in the inner shell. The inner manifold includes a plurality of flow passages and at least one insulator pocket substantially aligned with the plurality of flow passages. A cooled cooling air system for a gas turbine engine and a gas turbine engine assembly are also disclosed.

16 Claims, 5 Drawing Sheets

(51) Int. Cl.
    *F02C 3/04*     (2006.01)
    *F02C 9/18*     (2006.01)
    *F02K 3/115*     (2006.01)
    *F02C 6/08*     (2006.01)
    *F28F 9/02*     (2006.01)
    *F28D 21/00*     (2006.01)

(56) References Cited

U.S. PATENT DOCUMENTS

| | | |
|---|---|---|
| 5,267,608 A | 12/1993 | Coffinberry |
| 5,322,116 A | 6/1994 | Galloway et al. |
| 5,458,187 A | 10/1995 | Davis |
| 5,918,458 A | 7/1999 | Coffinberry et al. |
| 6,536,231 B2 | 3/2003 | Gupte |
| 6,892,523 B2 | 5/2005 | Fetescu et al. |
| 8,266,889 B2 | 9/2012 | Coffinberry |
| 8,376,036 B2 | 2/2013 | Kammerzell |
| 8,826,901 B2 | 9/2014 | Haydock et al. |
| 9,074,829 B2 | 7/2015 | Behrens et al. |
| 2004/0040280 A1 * | 3/2004 | Nirmalan ............... F02C 7/08 60/39.511 |
| 2014/0352315 A1 | 12/2014 | Diaz |

FOREIGN PATENT DOCUMENTS

| | | |
|---|---|---|
| WO | WO02/097354 A1 * | 12/2002 |
| WO | 2004/013557 A1 | 2/2004 |
| WO | 2015/105552 A1 | 7/2015 |

\* cited by examiner

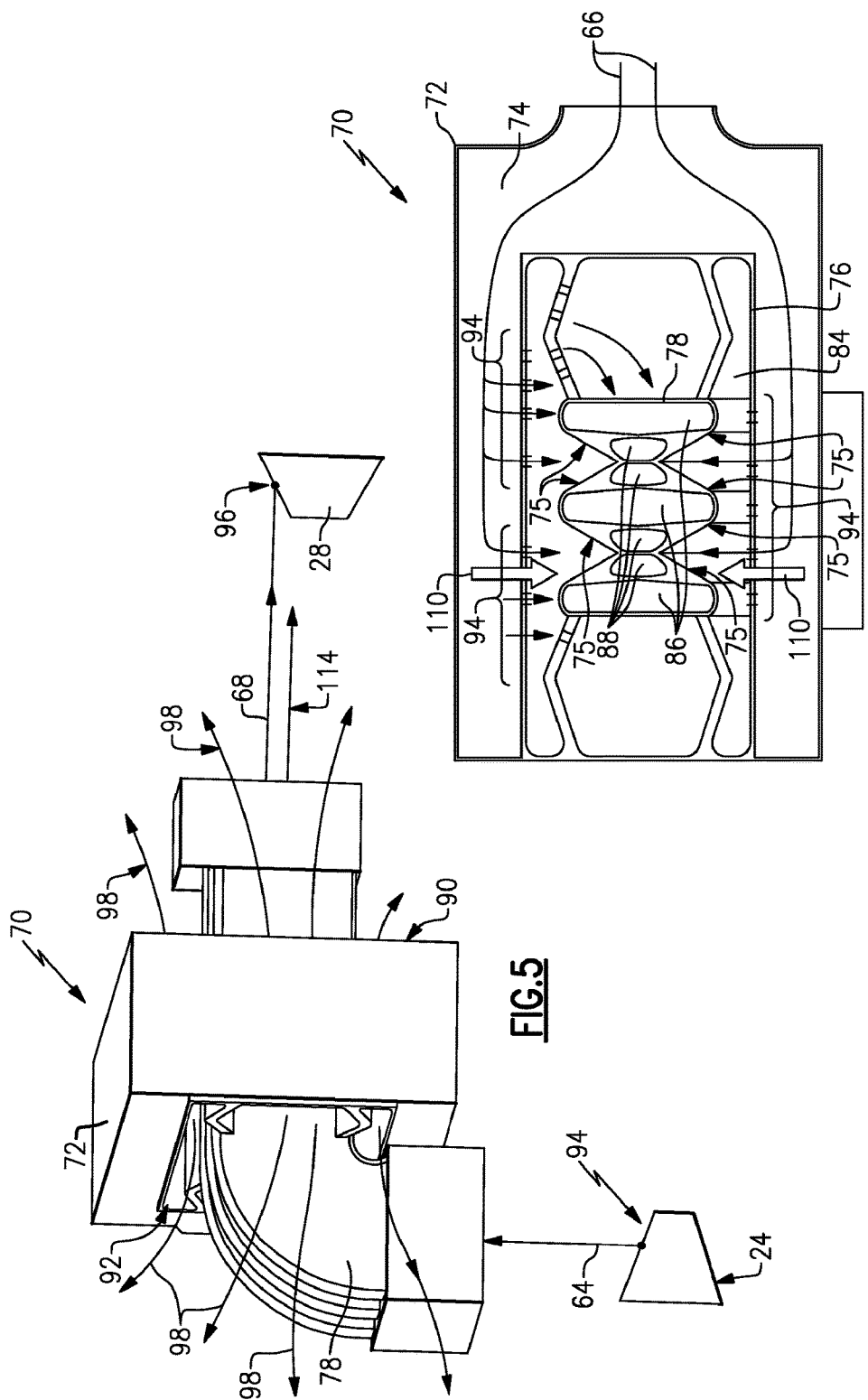

HEAT TEMPERATURE GRADIENT HEAT EXCHANGER

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

High engine efficiencies are linked to higher operating temperatures and pressures. Structures within the gas flow path are exposed to temperatures in excess of material capabilities and are therefore cooled with cooling airflow. Cooling airflow is drawn from the compressor section and may be further cooled utilizing heat exchangers to provide increased cooling capacity. Higher engine operating temperatures and pressures challenge the capacities of heat exchangers fabricated utilizing conventional materials and configurations.

SUMMARY

In a featured embodiment, a heat exchanger assembly includes an outer manifold defining an outer cavity. An inner cavity is defined by an inner shell supported within the outer manifold and at least partially surrounded by the outer cavity. The inner shell includes a plurality of impingement openings for directing airflow into the inner cavity. An inner manifold is supported within the inner cavity. The inner manifold is exposed to impingement airflow through the plurality of impingement openings in the inner shell. The inner manifold includes a plurality of flow passages and at least one insulator pocket substantially aligned with the plurality of flow passages.

In another embodiment according to the previous embodiment, the inner shell includes at least two fingers supporting the inner manifold. The at least two fingers are compliant to accommodate thermal expansion of the inner manifold.

In another embodiment according to any of the previous embodiments, includes at least one opening for airflow in each of the at least two fingers.

In another embodiment according to any of the previous embodiments, the outer manifold defines an inlet into the outer cavity, and the inner cavity is open at opposing first and second ends transverse to the direction of impingement flow.

In another embodiment according to any of the previous embodiments, includes at least two insulator pockets disposed between each of the plurality of flow passages.

In another embodiment according to any of the previous embodiments, the at least one insulator pocket is closed to airflow.

In another embodiment according to any of the previous embodiments, each of the plurality of passages includes a length substantially aligned with cooling airflow from the plurality of impingement openings. The length of each of the plurality of passages is greater than a width transverse to the direction of the cooling airflow from the plurality of impingement openings.

In another embodiment according to any of the previous embodiments, each of the plurality of passages includes a midpoint between a first end and a second end and a width at the midpoint is greater than a width at each of the first end and the second end.

In another embodiment according to any of the previous embodiments, an outer surface of the inner manifold includes peaks corresponding to the first end and the second end separated by valleys.

In another featured embodiment, a cooled cooling air system for a gas turbine engine includes a first source of airflow at a first pressure and temperature and a second source of airflow at a second pressure and temperature. The second temperature and pressure is less than the first temperature and pressure. A heat exchanger assembly includes an outer manifold defining an outer cavity and a cold inlet in communication with airflow from the second source. An inner shell defines an inner cavity. The inner shell is supported within the outer manifold and at least partially surrounded by the outer cavity. The inner shell includes a plurality of impingement openings for directing airflow from the outer manifold into the inner cavity. An inner manifold is supported within the inner cavity and a hot inlet in communication with airflow from the first source. The inner manifold is exposed to impingement airflow through the plurality of impingement openings in the inner shell. The inner manifold includes a plurality of flow passages and at least one insulator pocket substantially aligned with the plurality of flow passages.

In another embodiment according to the previous embodiment, the inner shell includes at least two fingers supporting the inner manifold. The at least two fingers are compliant to accommodate thermal expansion of the inner manifold.

In another embodiment according to any of the previous embodiments, the inner cavity is open at opposing first and second ends transverse to a direction of impingement flow.

In another embodiment according to any of the previous embodiments, the at least one insulator pocket is closed to airflow.

In another embodiment according to any of the previous embodiments, each of the plurality of passages includes a length substantially aligned with cooling airflow from the plurality of impingement openings. The length of each of the plurality of passages is greater than a width transverse to the direction of the cooling airflow from the plurality of impingement openings.

In another featured embodiment, a gas turbine engine assembly includes a compressor section including a bleed air opening for a first source of airflow at a first pressure and first temperature and a second source of airflow at a second pressure and a second temperature. A heat exchanger assembly includes an outer manifold defining an outer cavity and a cold inlet in communication with airflow from the second source. An inner shell defines an inner cavity. The inner shell is supported within the outer manifold and at least partially surrounded by the outer cavity. The inner shell includes a plurality of impingement openings for directing airflow from the outer manifold into the inner cavity. An inner manifold is supported within the inner cavity and a hot inlet in communication with airflow from the first source. The inner manifold is exposed to impingement airflow through the plurality of impingement openings in the inner shell. The inner manifold includes a plurality of flow passages and at least one insulator pocket substantially aligned with the plurality of flow passages. A turbine section includes at least one cooling air passage receiving cooled airflow from an outlet of the inner manifold.

In another embodiment according to the previous embodiment, the inner shell includes at least two fingers supporting the inner manifold. The at least two fingers are compliant to accommodate thermal expansion of the inner manifold.

In another embodiment according to any of the previous embodiments, the inner cavity is open at opposing first and second ends transverse to a direction of impingement flow.

In another embodiment according to any of the previous embodiments, the at least one insulator pocket is closed to airflow.

In another embodiment according to any of the previous embodiments, each of the plurality of passages includes a length substantially aligned with cooling airflow from the plurality of impingement openings. The length of each of the plurality of passages is greater than a width transverse to the direction of the cooling airflow from the plurality of impingement openings.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a cross section of the example heat exchanger embodiment.

FIG. 5 is a schematic view of the example heat exchanger embodiment.

DETAILED DESCRIPTION

Figure 1:
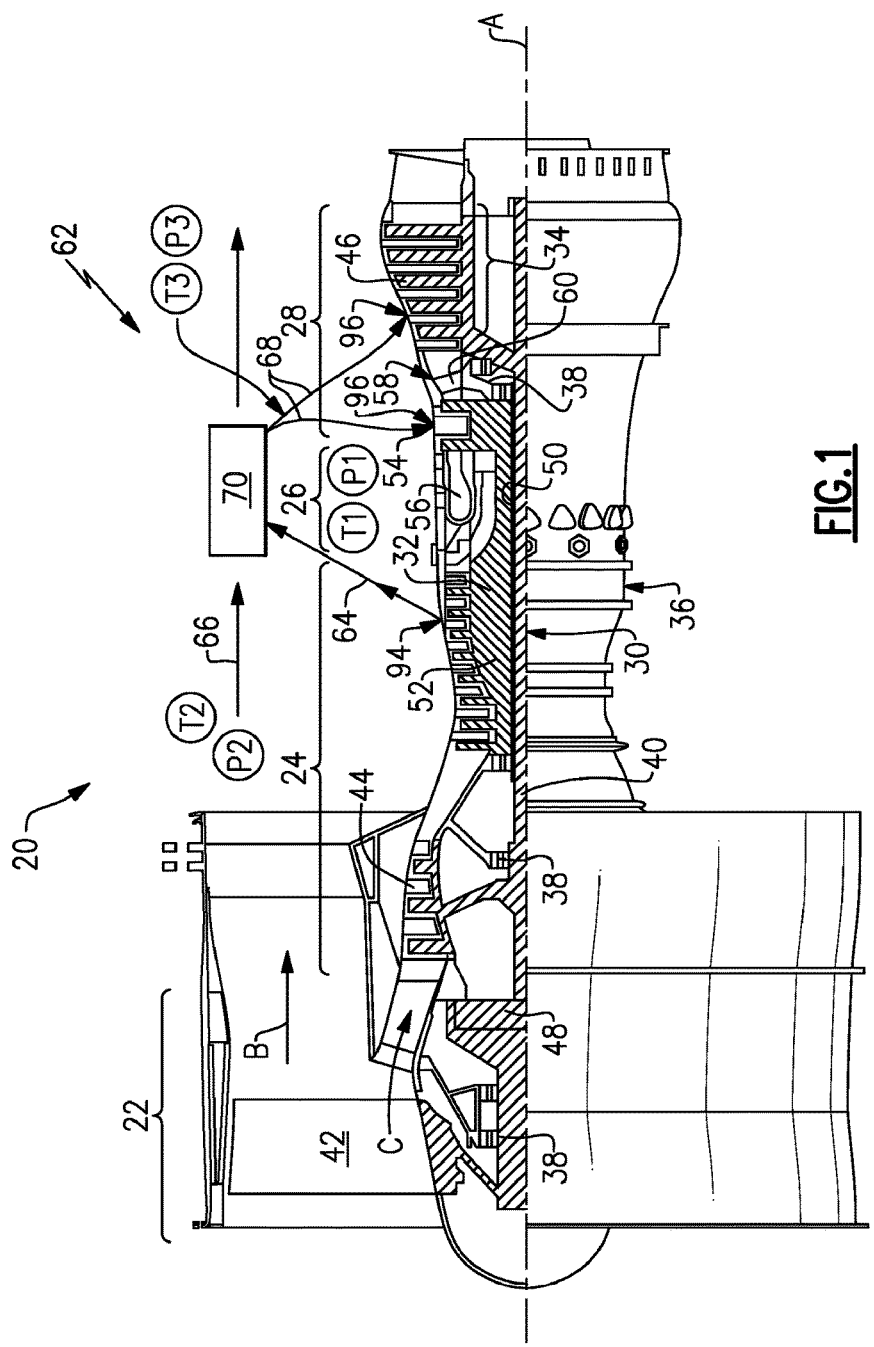
FIG. 1 schematically shows an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high energy exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high energy exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotor schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Increased gas turbine engine efficiencies are realized by increasing operating pressures and temperatures. However, challenges are raised in that the parts and components associated with a high pressure turbine require additional cooling air as the overall pressure ratio increases. Temperatures of the high energy gases through the turbine section can be much greater than the melting temperatures of the materials utilized in the fabrication of turbine components.

The example engine 20 includes a cooled cooling air system (CCA) 62 that receives air from an outlet 94 within the compressor section 24. Air from the outlet 94 is at a first temperature T1 and a first pressure P1. Bypass air 66 at a second temperature T2 and second pressure P2 is fed through a heat exchange 70 to cool airflow 64 from the compressor section 24. The second temperature T2 and second pressure P2 is significantly lower than the first temperature T1 and first pressure P1. The airflow 64 is cooled in the heat exchanger 70 and directed as cooled cooling air 68 to locations 96 within the turbine section 28. The cooled cooling air 68 that is supplied to the turbine section 28 is at a third temperature T3 that is cooler than the first temperature T1 and at a third pressure P3 that is substantially the same as the second pressure P2.

The temperature of the airflow 64 from the compressor section 24 may be as high as about 1500° F. (815° C.). The airflow 66 from the bypass flow path B is at ambient temperatures that can be well below 0° F. (−17° C.). Accordingly, the difference between temperatures generates significant thermal gradients within the heat exchanger 70.

Figure 2:
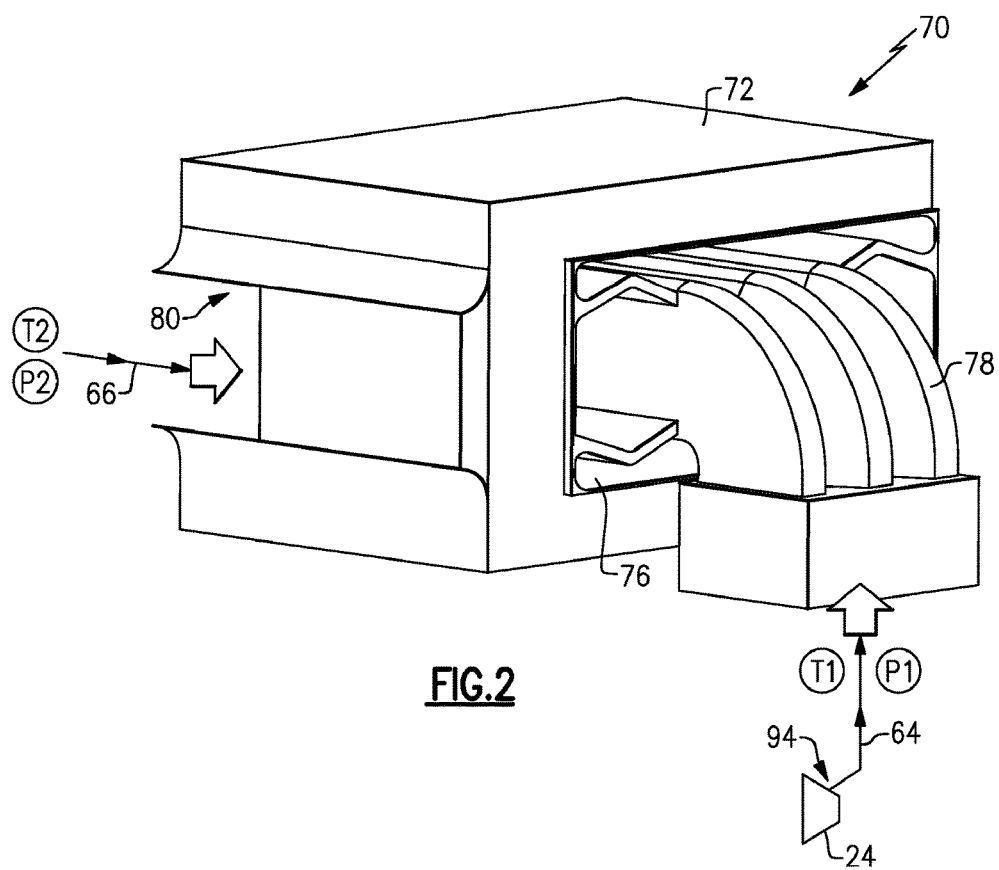
FIG. 2 is a perspective view of an embodiment of a heat exchanger.
Figure 3:
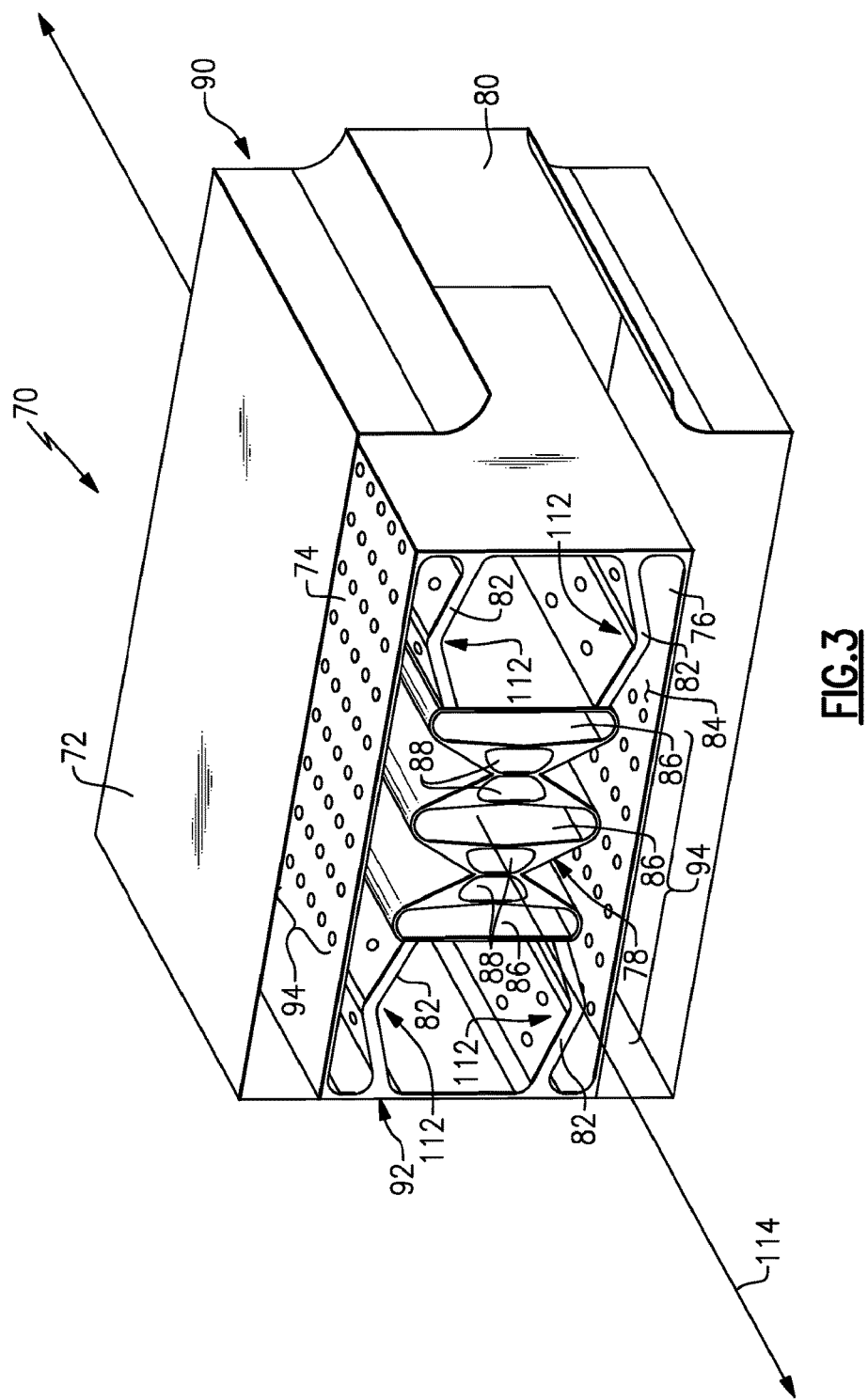
FIG. 3 is a sectional view of the example heat exchanger embodiment.

Referring to FIGS. 2 and 3 with continued reference to FIG. 1, the example heat exchanger 70 includes an outer manifold 72 that supports an inner manifold 78. The outer manifold 72 includes an inlet 80 that receives airflow 66 that is at the second temperature T2 and second pressure P2. The inner manifold 78 receives airflow 64 from the compressor section 24 that is at the first temperature T1 and first pressure P1. In this example, the first pressure P1 and first temperature T1 is much higher than the second temperature T2 and second pressure P2. Accordingly, the temperature gradient between the airflow 66 and the airflow 64 is significant and therefore generates a corresponding difference in temperature between the inner manifold 78 and the outer manifold 72 that is significant.

The outer manifold 72 includes an outer cavity 74. The outer cavity 74 surrounds an inner shell 76. The inner shell 76 defines an inner cavity 84 and includes plurality of impingement openings 94. The inner shell 76 also includes fingers 82 that support the inner manifold 78 within the outer manifold 72. Airflow entering the inlet 80 is communicated from the outer cavity 74 through the impingement openings 94 directly onto surfaces of the inner manifold 78.

The inner manifold 78 includes passages 86 for airflow 64 from the compressor section 24. The passages 86 are separated by insulator pockets 88 that do not include airflow. The insulator pockets 88 reduce differences in temperature across the inner manifold 78 to reduce thermal strains that may be caused by the elevated operational temperatures.

Referring to FIGS. 4 and 5 with continued reference to FIG. 3, cooling air 64 tapped from the compressor section 24 is communicated through the passages 86 of the inner manifold 78. Colder airflow 66 is communicated through the inlet 80 of the outer manifold 72 and into the outer cavity 74. The outer cavity 74 surrounds the inner shell 76. The inner shell 76 includes the plurality of impingement openings 94 that direct airflow against outer surfaces 75 of the inner manifold 78 in a direction indicated by arrows 110. The impingement airflow transfers thermal energy and cools the cooling airflow 64 through the inner manifold 78.

The inner shell 76 is open on first and second sides 90, 92 such that post-infringement airflow 98 exits through the first and second sides 90, 92 aligned with a direction of airflow through the passages 86 within the inner manifold 78. The post impingement airflow 98 is communicated to a lower pressure sink for air such as the fan bypass flow or the ambient environment.

The inner manifold 78 is supported within the inner shell 76 by the fingers 82. The fingers 82 includes a compliant configuration to accommodate the differences in thermal growth between the inner manifold 78 and the inner shells 76. In this example, the fingers 82 include a bent portion 112 that is disposed midway between the inner manifold 78 and the inner shell 76. The bent configuration 112 changes a thermal growth load between the inner manifold 78 and the inner shell 76 into a bending moment that reduces thermal strains on both the inner manifold 78 and the inner shell 76.

The inner manifold 78 is unconstrained along a major axis 114 by the inner shell 76. Accordingly, thermal growth along the major axis 114 is not constrained by the inner shell 76. In the disclosed example embodiment, the inner manifold 78 is supported by the inner shell 76, but not attached to the inner shell 76 to enable accommodations of differences in thermal growth. Accordingly, the inner manifold 78 is unconstrained for thermal growth along the major axis 114 and the fingers 82 accommodate thermal growth of the inner manifold 78 in direction transverse to the major axis 114.

Figure 6:
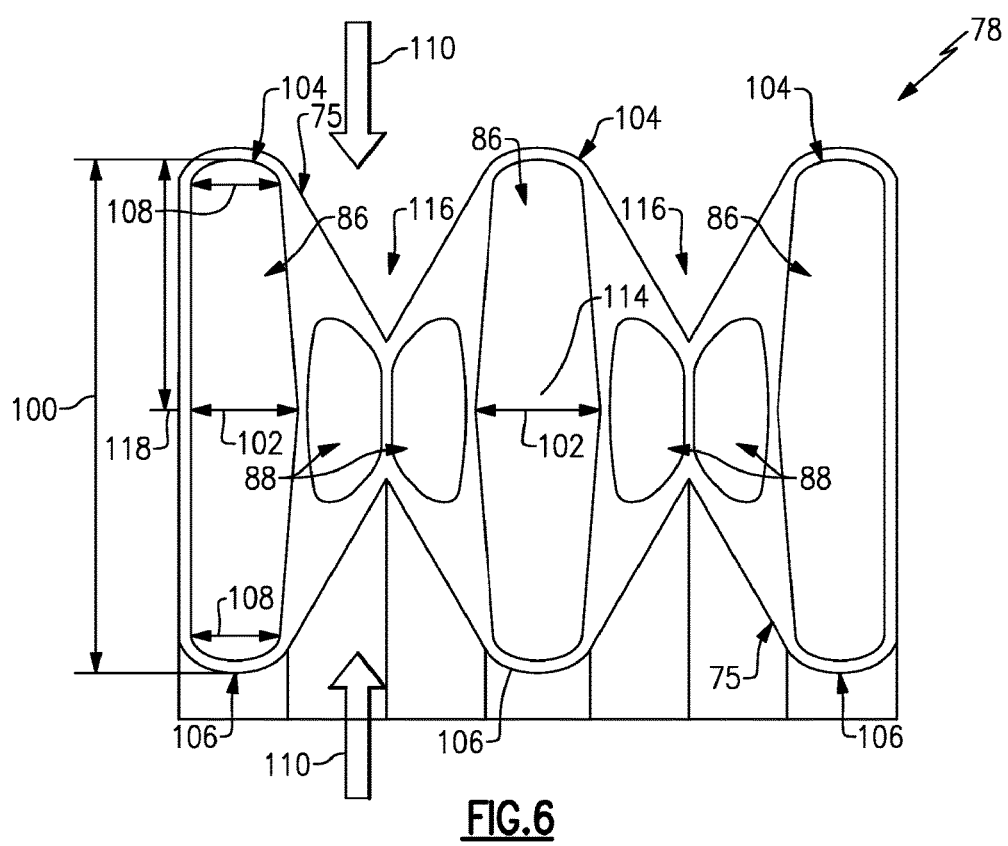
FIG. 6 is a cross section of an embodiment of an inner manifold of the example heat exchanger.

Referring to FIG. 6 with continued reference to FIGS. 4 and 5, the example inner manifold 78 includes the flow passages 86 for the airflow 64 from the compressor section 24. The passages include a length 100 that is transverse to the major axis 114 and aligned with the direction of impingement flow indicated by the arrows 110. The passages 86 include a first end 104 and a second end 106 that define peaks along the outer surface 75 between valleys 116. Impingement flow is directed along the outer surface 75 at the ends 104 and 106 and into the valleys 116 between the passages 86.

Each of the passages 86 includes the length 100, a width 108 at each end and a width 102 at a midpoint 118. The width 108 at the ends 104, 106 is smaller than the width 102 at the midpoint 118 between the first end 104 and the second end 106. In the disclosed embodiment, each of the passages 86 includes the width 102 that is greater than a width 108 at the ends 104, 106.

The inner manifold 78 further includes insulator pockets 88. The insulator pockets 88 are disposed between the passages 86 but are not in communication with airflow from the compressor section 24 or other sources of airflow. In the disclosed embodiment, there are two insulator pockets 88 disposed between each of the passages 86. The insulator pockets 88 generate relatively cool areas within the otherwise hot inner manifold 78. The cool areas provided by the insulator pockets 88 counteract lengthwise thermal growth aligned with the direction of the major axis 114. The insulator pockets 88 therefore provide a reduction in thermal growth that reduces stresses imparted on the inner manifold 78 and surrounding structures such as the inner shell 76.

Accordingly, the example heat exchanger 70 provides for the efficient cooling of cooling air at elevated thermal gradients while maintaining desired flow rates that enable increased engine operating efficiencies.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A heat exchanger assembly comprising:
an outer manifold defining an outer cavity
an inner cavity defined by an inner shell supported within the outer manifold and at least partially surrounded by the outer cavity, the inner shell including a plurality of impingement openings for directing airflow into the inner cavity; and
an inner manifold supported within the inner cavity, wherein the inner manifold is exposed to impingement airflow through the plurality of impingement openings in the inner shell, the inner manifold including a plurality of flow passages and at least one insulator pocket substantially aligned with the plurality of flow passages and closed to exposure to airflow.

2. The heat exchanger assembly as recited in claim 1, wherein the inner shell includes at least two fingers supporting the inner manifold, the at least two fingers are compliant to accommodate thermal expansion of the inner manifold.

3. The heat exchanger assembly as recited in claim 2, including at least one opening for airflow in each of the at least two fingers.

4. The heat exchanger assembly as recited in claim 1, wherein the outer manifold defines an inlet into the outer cavity, and the inner cavity is open at opposing first and second ends transverse to the direction of impingement flow.

5. The heat exchanger assembly as recited in claim 1, including at least two insulator pockets disposed between each of the plurality of flow passages.

6. The heat exchanger assembly as recited in claim 1, wherein each of the plurality of passages includes a length substantially aligned with cooling airflow from the plurality of impingement openings, the length of each of the plurality of passages is greater than a width transverse to the direction of the cooling airflow from the plurality of impingement openings.

7. The heat exchanger assembly as recited in claim 6, wherein each of the plurality of passages includes a midpoint between a first end and a second end and a width at the midpoint is greater than a width at each of the first end and the second end.

8. The heat exchanger assembly as recited in claim 7, wherein an outer surface of the inner manifold includes peaks corresponding to the first end and the second end separated by valleys.

9. A cooled cooling air system for a gas turbine engine comprising:
a first source of airflow at a first pressure and temperature;
a second source of airflow at a second pressure and temperature, the second temperature and pressure less than the first temperature and pressure; and
a heat exchanger assembly including:
an outer manifold defining an outer cavity and a cold inlet in communication with airflow from the second source;
an inner shell defining an inner cavity, the inner shell supported within the outer manifold and at least partially surrounded by the outer cavity, the inner shell including a plurality of impingement openings for directing airflow from the outer manifold into the inner cavity; and
an inner manifold supported within the inner cavity and a hot inlet in communication with airflow from the first source, wherein the inner manifold is exposed to impingement airflow through the plurality of impingement openings in the inner shell, the inner manifold including a plurality of flow passages and at least one insulator pocket substantially aligned with the plurality of flow passages and closed to exposure to airflow.

10. The cooled cooling air system as recited in claim 9, wherein the inner shell includes at least two fingers supporting the inner manifold, the at least two fingers are compliant to accommodate thermal expansion of the inner manifold.

11. The cooled cooling air system as recited in claim 9, wherein the inner cavity is open at opposing first and second ends transverse to a direction of impingement flow.

12. The cooled cooling air system as recited in claim 9, wherein each of the plurality of passages includes a length substantially aligned with cooling airflow from the plurality of impingement openings, the length of each of the plurality of passages is greater than a width transverse to the direction of the cooling airflow from the plurality of impingement openings.

13. A gas turbine engine assembly comprising:
a compressor section including a bleed air opening for a first source of airflow at a first pressure and first temperature;
a second source of airflow at a second pressure and a second temperature;

a heat exchanger assembly including;
an outer manifold defining an outer cavity and a cold inlet in communication with airflow from the second source,
an inner shell defining an inner cavity, the inner shell supported within the outer manifold and at least partially surrounded by the outer cavity, the inner shell including a plurality of impingement openings for directing airflow from the outer manifold into the inner cavity; and
an inner manifold supported within the inner cavity and a hot inlet in communication with airflow from the first source, wherein the inner manifold is exposed to impingement airflow through the plurality of impingement openings in the inner shell, the inner manifold including a plurality of flow passages and at least one insulator pocket substantially aligned with the plurality of flow passages and closed to exposure to airflow; and a turbine section including at least one cooling air passage receiving cooled airflow from an outlet of the inner manifold.

14. The gas turbine engine assembly as recited in claim 13, wherein the inner shell includes at least two fingers supporting the inner manifold, the at least two fingers are compliant to accommodate thermal expansion of the inner manifold.

15. The gas turbine engine assembly as recited in claim 13, wherein the inner cavity is open at opposing first and second ends transverse to a direction of impingement flow.

16. The gas turbine engine assembly as recited in claim 13, wherein each of the plurality of passages includes a length substantially aligned with cooling airflow from the plurality of impingement openings, the length of each of the plurality of passages is greater than a width transverse to the direction of the cooling airflow from the plurality of impingement openings.

* * * * *